United States Patent [19]

Petersen

[11] 3,919,519

[45] Nov. 11, 1975

[54] WELDING MATERIAL

[75] Inventor: Walter Adrian Petersen, Ridgewood, N.J.

[73] Assignee: The International Nickel Company, Inc., New York, N.Y.

[22] Filed: July 27, 1973

[21] Appl. No.: 383,380

Related U.S. Application Data

[62] Division of Ser. No. 221,400, Jan. 27, 1972, Pat. No. 3,770,427.

[52] U.S. Cl. .............................. 219/137; 219/145
[51] Int. Cl. .................................... B23k 9/02
[58] Field of Search ........................ 219/145, 137

[56] References Cited

UNITED STATES PATENTS 3,184,577  5/1965  Witherell ........................ 219/145
3,286,075  11/1966  Kautz et al. ..................... 219/137

FOREIGN PATENTS OR APPLICATIONS 987,616  3/1965  United Kingdom ............... 219/145

254,688  10/1968  U.S.S.R. ........................... 219/145

Primary Examiner—C. L. Albritton
Assistant Examiner—Clifford C. Shaw
Attorney, Agent, or Firm—Miriam W. Leff; Ewan C. MacQueen

[57] ABSTRACT

A consumable welding material particularly suitable for welding products nominally containing nickel-28% chromium-10% iron, comprising, by weight, about 27% to 31.5% chromium, about 5% to 14% iron, about 0.5% to 1.1% aluminum, about 0.1% to 0.7% titanium, about 0.02% to 0.08% carbon, up to about 0.1% magnesium, up to about 0.010% nitrogen and the balance nickel and incidental elements.

The welding material provides substantially sound, corrosion-resistant weld deposits.

1 Claim, No Drawings

WELDING MATERIAL

The present application is a division of application Ser. No. 221,400, filed Jan. 27, 1972 now U.S. Pat. No. 3,770,427.

The present invention relates to nickel-base welding materials and, more particularly, to nickel-chromium-iron filler metal for insert gas-shielded arc welding.

Nickel-base alloy materials nominally including, by weight, nickel, about 28% chromium and about 10% iron, e.g., those of the type disclosed in U.S. Pat. Nos. 3,565,611 and 3,573,901 issued to Economy on Feb. 23, 1971 and Apr. 6, 1971, respectively, and 3,574,604 issued to Copson and Van Rooyen on Apr. 13, 1971, are commercially desirable, inter alia, because of their good corrosion resistance, particularly in environments such as high-temperature, high-pressure water containing lead or environments containing chloride ions; caustic materials; or nitric acid. Such nickel-base alloys nominally containing 28% chromium and 10% iron can include, for example, by weight, about 27% to 31% chromium, about 7% to about 11% iron, up to about 0.05% carbon, up to about 0.5% silicon, up to about 0.5% manganese, about 0.1% to about 0.4% aluminum, about 0.1% to about 0.5% titanium, about 0.005% to about 0.06% magnesium, about 0.001% to about 0.01% boron, up to about 0.2% copper and the balance essentially nickel. It is often desirable from the standpoint of cost and reliability, that structures and/or parts made with various shapes, e.g., sheet, plate, strip, rod, pipe, etc., of these nickel-base alloy materials be fabricated by welding, it being necessary in many applications that the corrosion resistance of the welded joints be comparable to that of the parent metal. However, when welded joints are made using filler material of the parent alloy composition, excessive weld cracking is observed. For example, butt welds made in 1-inch thick air-melted base plates containing, by weight, 29.9% chromium, 8.6% iron, 0.021% carbon, 0.16% manganese, 0.014% magnesium, less than 0.02% silicon, 0.004% oxygen, 0.0006% hydrogen, 0.0635% nitrogen, and the balance essentially nickel, using filler metal of matching composition and a downhand manual gas tungsten-arc technique, exhibit, at 10× magnification, an average of 4.7 cracks per section in the as-welded condition, in transverse slices polished and etched with Lepito's reagent. These cracks have lengths not exceeding one-eighth inch. Two of the transverse slices cut from these welds, polished and etched with Lepito's reagent and then subjected, in the as-welded condition, to side bend tests, which involve bending the weld area of the slice 180° about a 1½ inch diameter (4 times the slice thickness) pin exhibited an average of 26.0 cracks per section at 10× magnification.

On the other hand, welds made with presently available commercial, non-matching nickel-chromium-iron alloy filler material exhibit soundness when used with parent metal typically having the above nominal composition, but do not always offer adequate corrosion resistance.

It has now been discovered that sound weld joints exhibiting good corrosion resistance can be produced in materials nominally containing nickel-28% chromium-10% iron by employing a special nickel-chromium-iron alloy welding material. The special welding material provides desirable results when used to weld various mill forms, e.g., plates, strip, tubing, rod, etc., of such composition to each other or to shapes of significantly different composition and can be used to provide overlays.

It is an object of the present invention to provide an improved welding material that provides relatively sound, corrosion-resistant welded joints.

Another object is to provide an improved welding material particularly suitable for welding parts, containing, nominally, nickel-28% chromium-10% iron.

Still another object is to provide an improved welding material composition exhibiting good hot workability.

Generally speaking, the present invention contemplates a consumable welding filler material usable in arc welding processes, including manual and automatic gas-metal arc welding, manual and automatic gas tungsten-arc welding, and inert gas shielded-arc and submerged-arc welding, such welding material containing, by weight, at least about 27%, but not more than about 31.5% chromium; about 5% to about 14%, more preferably, about 8% to about 11%, iron; about 0.5% to about 1.1% aluminum; about 0.1% to about 0.7% titanium; up to about 0.1% of magnesium; about 0.05% to about 5% manganese; about 0.02% to about 0.08% carbon; and the balance nickel and incidental impurities. Nitrogen may be present in the wire but preferably is limited to amounts less than about 0.030% and more preferably less than about 0.01%.

The welding electrode can also include up to about 0.3% silicon, up to about 0.5% copper, up to approximately 0.01% oxygen, up to about 0.01% sulfur, up to about 0.01% phosphorous and up to approximately 0.001% hydrogen. Preferably, the material is substantially devoid of boron, zirconium, cobalt, columbium, molybdenum and tungsten although amounts up to each 0.1% zirconium, 6% cobalt, 2% molybdenum, and 2% tungsten may be present. Larger amounts of these elements may lead to excessive weld cracking.

Welds produced with welding material provided in accordance with the present invention, are substantially free of cracks and porosity, even when relatively thick, e.g., 1 inch, materials are welded, and exhibit corrosion resistance comparable to that of the parent metal of the type having a nominal composition of nickel-28% chromium-10% iron.

It is essential that all of the foregoing ingredients of the welding material composition be present in the amounts specified in order to provide useful operatiing characteristics during welding and sound welds having good mechanical properties and to provide the further benefit of excellent corrosion resistance in severely corrosive environments. For example, the chromium level of the wire should be at least about 27 weight percent so that welds made therefrom will be corrosion resistant, e.g., will be substantially free from cracking, when exposed to environments such as those common to high-temperature, high-pressure water systems, e.g., those environments found in nuclear reactors. Chromium levels significantly exceeding about 31.5% are not desirable, however, because such amounts can lead to the formation of undesirable precipitates, e.g., alpha chromium, resulting in unsound welds and impaired corrosion resistance in lead-contaminated water environment. The presence of both titanium and aluminum in the welding material in the amounts specified is necessary to provide weld soundness in both the as-welded condition and in the aged condition. It is found that the number of weld cracks increases significantly as the titanium and aluminum levels are decreased below the respective lower amounts specified therefor. Titanium and aluminum levels higher than those specified have been found to lead to cracking in the cold working operations commonly associated with wire processing. It appears that aluminum contents on the order of about 0.5% to about 0.7% are beneficial in gas-shielded metal-arc welding.

Magnesium desirably is present in the filler material in an amount up to 0.1% as a malleabilizer to prevent cracking during hot working of the material. A small residual magnesium content in the weld, which may be on the order of up to about 0.03% appears to be of assistance in avoiding weld reheat cracking; i.e., cracking due to the heat from subsequent weld passes. The nitrogen content of the welding, or filler, material preferably is low to minimize the propensity to weld cracking, particularly where the weld is to be subsequently aged. In this respect, it is preferred that the welding material be produced by vacuum melting techniques so as to minimize nitrogen content.

Carbon levels of the welding material should be maintained above about 0.02 weight percent to avoid weld deposit cracking, but below about 0.08 weight percent to limit excessive corrosive attack on the weld deposit. Manganese in amounts up to about 5% is desired in the welding material produced according to the invention to reduce susceptibility to weld cracking, the preferred amount of manganese being at least about 0.05%.

While various iron contents over the range of about 5% to 14%, by weight, appear to provide comparable results with respect to the absence of weld cracking, welds produced with welding material containing less than 5% iron exhibit poor corrosion resistance in lead-contaminated water while those produced with welding material with more than 14% iron exhibit inadequate corrosion resistance in caustic environments.

Silicon can be present in the welding material in amounts up to about 0.3% without any apparent effects on the performance of the filler wire.

The welding material produced according to the present invention can be in the form of, for example, sheet, strip, tube or wire.

In addition to its use in welding together various parts having the above nominal composition, i.e., 28% chromium, 10% iron, balance essentially nickel, the welding material produced according to this invention can be used to weld such parts to other parts generally having different composition. Such parts of different composition can include, by weight, up to about 50% iron, about 14% to about 35% chromium, up to about 6% each of manganese, copper, cobalt and columbium, up to about 0.15% carbon, up to about 2% titanium, up to about 4% aluminum, up to about 3% each of vanadium and tungsten, up to about 2.5% silicon, up to about 1% tantalum, up to about 10% molybdenum and the balance essentially nickel. Examples of alloys within this compositional range are 18–8 stainless steel and Alloy 600. Another example of an alloy that can be welded to the above types of compositions or to itself, using the welding wire of the invention, is low alloy steel.

For the purpose of giving those skilled in the art a better understanding of the invention and a better appreciation of the advantages thereof, the following examples are given.

EXAMPLE I

Filler wire having the composition shown in Table I was produced by vacuum melting in a 50 kilowatt induction furnace, a charge of 28.5 kilograms of Mond nickel shot and 4.8 kilograms of electrolytic iron, after which 13.68 kg. of Vacuum Grade low-carbon chromium, 72 grams of electrolytic manganese, and 72 grams of metallic silicon were added to the molten charge, and the charge then held for 30 minutes under vacuum at 2850° to 2900°F. Then 240 grams of high-carbon chromium was added to the charge and the furnace backfilled to ½ atmosphere argon, after which there were sequentially added to the molten charge, 384 grams of aluminum rod, 240 grams of titanium sponge, and 194 grams of nickel-15% magnesium master alloy. The molten charge was then poured into a cast iron ingot mold. The ingots were machined to remove the surface layer and then soaked at 2250°F. for 2 hours, hot rolled to 2-inch square bars, reheated at 2250° F., and rolled to ⅝-inch square rod, which rod was cold rolled and swaged to filler wire having a diameter of one-eighth inch.

TABLE I

| | | | Filler Wire Composition (wt.%)(a) | | | | | |
|---|---|---|---|---|---|---|---|---|
| Cr | Fe | Al | Ti | Si | Mn | Mg | C | Ni |
| 29.3 | 11.7 | 0.71 | 0.54 | 0.18 | 0.07 | 0.024 | 0.062 | Bal. |

(a) Also contains 0.0038% Oxygen, 0.00019% Hydrogen and 0.0058% Nitrogen

Manual gas tungsten-arc butt welds (hereinafter referred to as Weld Numbers 1 and 2) were made in one inch thick plates of, respectively, a vacuum melted alloy and of a commercial air-melted alloy. The welds were made using as filler material ⅛-inch diameter wire of the composition shown in Table I. The vacuum-melted plate contained about 28.5% chromium, about 10.8% iron, about 0.03% aluminum, about 0.010% carbon, about 0.015% magnesium, less than about 0.05% silicon, about 0.48% titanium, about 0.15% manganese, 0.0084% oxygen, 0.00018% hydrogen, 0.017% nitrogen and the balance essentially nickel, and the air-melted plate of commercial origin contained 29.8% chromium, 8.6% iron, 0.14% aluminum, 0.29% titanium, 0.16% manganese, 0.021% carbon, 0.014% magnesium, less than about 0.02% silicon, 0.0039% oxygen, 0.0006% hydrogen, 0.0635% nitrogen, and the balance essentially nickel. These plates were in the hot-rolled and annealed (2100°F. for 1 hour and water quenched) condition, as were the plates of the following examples. The above welds were made in the flat position at about 230 amperes direct current, straight polarity (DCSP) and 16 volts and were completed in 24 passes, the travel speed being approximately 3 inches per minute. Each of the plates measured 3 by 4 inches by 1 inch thick and had a 15° bevel along one 4-inch edge, blended to a 3/32-inch root face by a ¼-inch radius. The plates were heavily restrained with U-clamps to a 3-inch thick copper-faced steel platen during welding, such restraint and the relatively thick plates being considered to provide severe welding conditions.

The weld deposits in the vacuum-melted plate typically contained 0.036% carbon, 0.08% manganese, 0.15% silicon, 28.0% chromium, 0.59% aluminum, 0.43% titanium, 10.0% iron, 0.003% magnesium, 0.0021% oxygen, 0.00019% hydrogen, 0.0120% nitrogen, and the balance nickel, while the weld deposits in air-melted plates typically contained 0.035% carbon, 0.09% manganese, 0.14% silicon, 28.3% chromium, 0.58% aluminum, 0.46% titanium, 9.6% iron, 0.003% magnesium, 0.0024% oxygen, 0.00030% hydrogen, 0.0160% nitrogen and the balance nickel.

Radiographic examination of these welds indicated them to be free of defects. Each of the plates was cut transversely through the weld into two ½-inch and four ⅜-inch thick slices inclusive of a weld section, each such slice then being polished on a rubber-bonded abrasive wheel, macro-etched with Lepito's reagent and then macroscopically examined at a magnification of 10×. In 14 faces that were examined, the welds in the vacuum-melted plate material exhibited only one crack and that was less than 1/32-inch long, for an average of 0.07 cracks per section, while the air-melted commercial plate weld exhibited, in 14 faces examined, three cracks that were individually shorter than 1/32-inch for an average of 0.2 cracks per section.

Two of the four ⅜-inch wide transverse slices cut from each of the two welds (Nos. 1 and 2) were given a post-weld aging treatment by heating for 20 hours at 1300°F. and air cooling. These aged slices, as well as two ⅜-inch wide slices from each of the welds in the as-welded condition, were etched with Lepito's reagent, side-bend tested, and examined to further determine their weld soundness. The side-bend tests consisted of bending the various transverse slices 180° about 1½ inch diameter (4× specimen thickness) pin. Because of the deformation involved in bending the weld specimen, cracks, fissures and other defects become more readily apparent so that examination of bend-tested welds is considered to be a relatively severe test for weld soundness. The aging treatment is considered to further increase the severity of the bend test. On macroscopic examination of the side-bend tested specimens at 10× magnification, the welds in the slices from the commercial air-melted plate contained, on the average, 1.0 cracks per section for the as-welded condition and 1.5 cracks per section for the aged condition, while the slices from the vacuum-melted plate showed no cracking in either the as-welded or aged condition. The low incidence of cracks in the air-melted commercial plate is well within the allowable limits for this class of welding material, as specified in MIL-E-21562B (Ships). These results show the satisfactory results obtainable with filler wire produced according to the present invention.

The two ½-inch wide transverse slices cut from each of the two welds, i.e., Weld Nos. 1 and 2, were tensile tested for room temperature mechanical properties, the test specimens being cut to locate the weld in center of the gauge length. The test results are given in the following Table II which also provides the properties of unwelded air-melted base plate of comparable composition to that of the air-melted plate described hereinbefore, in the hot-rolled and hot-rolled and annealed (45 min. at 2000°F. and air cool) conditions.

TABLE II

|  | Yield Strength (0.2% offset (ksi)* | Ultimate Tensile Strength (ksi)* | Elongation % | Reduction In Area % |
| --- | --- | --- | --- | --- |
| Weld No. 1 (as-welded) | 53.2 | 88.2(d) | 36.5 | 53.0 |
| Weld No. 2 (as-welded) | 63.0 | 92.2(d) | 27.0 | 53.8 |
| Hot-rolled Plate | 54.0 | 106.0 | 42.0 | 60.0 |
| Hot-Rolled and Annealed Plate | 37.0 | 97.0 | 3.0 | 65.0 |

(d)Fracture at weld
*(ksi) = 1000 pounds per square inch

From these results, it can be seen that the yield strengths of the welds were higher than that for the annealed plate and about the same as the hot rolled plate, while the ultimate tensile strengths of the welds compared favorably with those for the plate material in both conditions.

EXAMPLE II

To evaluate plate welds between a nickel-base alloy of the above-mentioned nominal composition (i.e., nickel-28% chromium-10% iron) and an alloy of dissimilar composition, the filler wire described in Example I was used to butt weld a commercial, air-melted one inch thick plate of the same composition and configuration as that described in Example I, to similarly beveled plates of Alloy 600 (a nickel-base alloy nominally containing about 15.5% chromium and 8% iron) and of Type 304 stainless steel (18% chromium, 8% nickel and balance iron). The welding was done under conditions similar to those in Example I, i.e., downhand (flat position) manual gas tungsten-arc welding employing 230 amperes DCSP and 16 volts, the welds being completed in 24 passes each. The weld to the Alloy 600 plate contained 0.037% carbon, 0.10% manganese, 27.9% chromium, 9.7% iron, 0.54% aluminum, 0.49% titanium, 0.078% silicon, 0.002% magnesium, 0.0023% oxygen, 0.00014% hydrogen and 0.0150% nitrogen, while the weld to the stainless steel plate contained 0.036% carbon, 0.17% manganese, 27.2% chromium, 12.9% iron, 0.55% aluminum, 0.45% titanium, 0.13% silicon, 0.005% magnesium, 0.0031% oxygen, 0.00009% hydrogen and 0.0175% nitrogen.

Raidographic examination of each of these welds did not reveal any defects therein. The welded plates were sliced transverse to the weld, polished and macroetched with Lepito's reagent in the manner described in Example I. Macroscopic examination at 10× magnification of these etched slices in the as-welded condition disclosed an average number of 0.3 cracks per section in the weld to the Alloy 600 and no cracks in the weld to the Type 304 stainless steel.

Side bend tests were performed on one group of these slices, each of which was in the as-welded condition and had a ⅜-inch thickness, and on a third group of these slices of the same thickness that had been aged, after welding, at 1300°F. for 20 hours and air cooled. All of the slices were etched with Lepito's reagent before the bend test was performed. The bend tests were conducted in the manner described in Example I. The bend test specimens were then examined for weld cracks at 10× magnification. The weld between the commercial plate and the plate of Alloy 600 exhibited no cracks in the as-welded condition and an average number of only 1.0 cracks per section in the aged condition, while the weld between the commercial plate and the plate of Type 304 stainless steel exhibited an average number of only 1.0 cracks per section in each of the as-welded and aged conditions.

The above-described welded plates also exhibited good mechanical properties in both the as-welded and aged condition, as seen from the results in Table III, where the Alloy 600 plate welds and the stainless steel 304 welds, respectively, are referred to as Weld Nos. 3 and 4. The test specimens were ½-inch thick slices cut from the respective welded plates.

transversely to the weld, polished on a rubber-bonded abrasive wheel and etched with Lepito's reagent, as described in Example I. Macroscopic examination of 14 transverse faces at 10× magnification revealed no cracks to be present. Side bend tests were performed in the manner described in Example I on ⅜-inch thick slices cut from the welded plates, polished and etched with Lepito's reagent, these slices being in the as-welded condition and in the aged (1300°F./20 hours and air cooled) condition. The thus-tested slices were then examined at 10× magnification. Only one of the two as-welded bend test specimens showed a single crack, for an average number of 0.5 cracks per section, while the aged bend-test specimens were free from cracking, thus indicating the usefulness of the filler metal produced according to this invention, for the gas-shielded metal-arc welding process.

EXAMPLE IV

To determine the corrosion resistance of welds made with filler wire produced according to the present invention, air-melted filler wire containing, by weight, Table III

| Weld No. | Yield Strength (0.2% offset) (ksi)* | Ultimate Tensile Strength (ksi)* | Elongation (%) | Reduction In Area (%) | Fracture Location |
|---|---|---|---|---|---|
| | | As Welded | | | |
| 3 | 52.4 | 90.4 | 32.5 | 55.5 | Weld |
| 4 | 53.7 | 84.7 | 33.5 | 68.8 | Base Metal |
| | | Aged (1300°F./20 hrs. + Air Cooled) | | | |
| 3 | 48.8 | 94.7 | 23.5 | 62.0 | Base Metal |
| 4 | 43.5 | 84.1 | 28.5 | 74.5 | Base Metal |

*(ksi) = 1000 pounds per square inch

The above results indicate the ability to provide satisfactory welded joints with filler wire produced according to the present invention, between an alloy nominally containing nickel-28% chromium-10% iron and dissimilar alloys, such as Type 304 stainless steel or Alloy 600.

EXAMPLE III

To determine the versatility of filler wire of the present invention, 0.062 inch diameter filler wire prepared from a laboratory air-melted heat produced with raw materials of high purity, containing 27.8% chromium, 10.4 iron, 0.056% carbon, 0.16% manganese, 0.14% silicon, 0.98% aluminum, 0.12% titanium, 0.053% magnesium, about 0.0002% hydrogen, about 0.015% oxygen, about 0.020% nitrogen, and the balance essentially nickel was used to produce a butt weld, using the automatic gas-shielded metal-arc welding process, between air-melted one inch thick plates containing about 28.9% chromium, about 10.9% iron, about 0.067% carbon, about 0.25% manganese, about 0.21% silicon, about 0.08% aluminum, about 0.31% titanium, about 0.02% magnesium, about 0.0006% oxygen, 0.00007% hydrogen, about 0.0365% nitrogen, and the balance essentially nickel. The weld was completed in 8 passes using 300 amps, 32 volts, and 10 inches per minute travel speed. The weld composition was 28.2% chromium, 10.8% iron, 0.026% magnesium, 0.068% carbon, 0.19% manganese, 0.16% silicon, 0.71% aluminum, 0.17% titanium, 0.0105% oxygen, 0.00019% hydrogen, 0.0385% nitrogen, and the balance essentially nickel. No weld cracks were detected on radiographic examination of the weld. The welded plates were sliced 27.7% chromium, 10.3% iron, 0.050% carbon, 0.15% manganese, 0.19% silicon, 0.52% aluminum, 0.68% titanium, 0.064% magnesium, 0.0097% oxygen, 0.023% nitrogen, about 0.0002% hydrogen, and the balance essentially nickel, was used to produce a butt weld in 1-inch thick hot-rolled, air-melted plate containing about 28.9% chromium, about 10.9% iron, about 0.067% carbon, about 0.25% manganese, about 0.21% silicon, about 0.08% aluminum, about 0.31% titanium, about 0.02% magnesium, about 0.0365% nitrogen, about 0.0006% oxygen, about 0.00007% hydrogen and the balance essentially nickel. The butt weld, was produced by downhand, manual, gas-shielded tungsten-arc weld methods using 220 amps, 16 volts with an estimated travel speed of 3 inches per minute and was radiographically sound. Pieces cut from the welded plate were immersed in boiling 65% nitric acid for five sequential periods of 48 hours each. No preferential attack was noted in the weld areas and the general corrosion rate was equivalent to that of the base alloy. These same slices from the welded plate, which were deformed to double U-bend specimens and tested for 48 weeks in aerated and de-aerated water of pH 10 (adjusted with NaOH) at 600°F., exhibited no apparent intergranular cracking or accelerated corrosive attack. The double U-bend specimens were made by simultaneously bending two coinciding slices, each having approximate dimensions of ⅛ by ½ by 3¼ inches, over a ¾-inch diameter mandrel so that the weld deposits were located at the apex of the bend.

Although the present invention has been described in conjunction with preferred embodiments, it is to be un-

I claim:

1. A method of producing relatively crack-free, corrosion-resistant weld joints between metal pieces wherein at least one of the pieces to be joined by welding contains about 28% chromium, about 10% iron, and the balance essentially nickel and incidental constituents, said method comprising gas-shielded arc welding said pieces with filler metal consisting essentially of, by weight, about 27% to about 31.5% chromium, about 5% to about 14% iron, about 0.5% to about 1.1% aluminum, about 0.1% to about 0.7% titanium, up to about 0.1% magnesium, about 0.05% to about 5% manganese, about 0.02% to about 0.08% carbon, up to about 0.3% silicon, up to about 0.5% copper, up to about 0.030% nitrogen, up to about 0.1% zirconium, up to about 6% cobalt, up to about 2% molybdenum, up to about 2% tungsten, up to about 0.01% each of phosphorus and sulfur and the balance essentially nickel.

* * * * *